United States Patent Office 3,634,408
Patented Jan. 11, 1972

3,634,408
5-SUBSTITUTED 5,10-DIHYDRO-11H-DIBENZO
[b,e][1,4]DIAZEPIN-11-ONES
Gunther Schmidt, Robert Engelhorn, Matyas Leitold, and
Hans Machleidt, Biberach an der Riss, Germany, assignors to Boehringer Ingelheim G.m.b.H., Ingelheim
am Rhein, Germany
No Drawing. Filed Aug. 7, 1969, Ser. No. 848,356
Claims priority, application Germany, Aug. 20, 1968,
P 17 95 176.7; June 20, 1969, P 19 31 487.5
Int. Cl. C07d 53/02
U.S. Cl. 260—239.3 T                          16 Claims

ABSTRACT OF THE DISCLOSURE

5 - substituted 5,10 - dihydro - 11H-dibenzo[b,e][1,4]
diazepin-11-ones of the formula

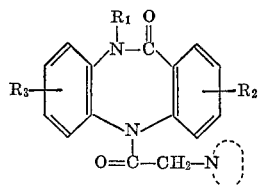

wherein $R_1$ is hydrogen or alkyl of 1 to 4 carbon atoms,
$R_2$ and $R_3$, which may be identical to or different from
each other, are each hydrogen or halogen, and

is a 5- to 7-membered monocyclic heterocyclic ring
which may optionally comprise an additional nitrogen
or oxygen ring atom and/or may optionally have one
or two alkyl of 1 to 4 carbon atoms, a hydroxyalkyl
of 1 to 4 carbon atoms, an alkoxy of 1 to 4 carbon
atoms, a benzyl or methyl-benzyl substituents attached
to a ring atom,
and non-toxic, pharmacologically acceptable acid addition salts thereof, useful as inhibitors of stomach ulcers
and stomach juice secretion in warm-blooded animals.

This invention relates to novel 5-substituted 5,10-dihydro - 11H - dibenzo[b,e][1,4]diazepin-11-ones and nontoxic, pharmacologically acceptable acid addition salts
thereof, as well as to a method of preparing these compounds.

More particularly, the present invention relates to 5-heterocyclic aminoacetyl - 5,10-dihydro-11H-dibenzo[b,e]
[1,4]diazepin-11-ones of the formula

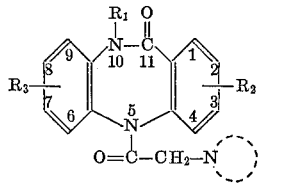

wherein $R_1$ is hydrogen or alkyl of 1 to 4 carbon atoms,
$R_2$ and $R_3$, which may be identical to or different from
each other, are each hydrogen or halogen, and

is a 5- to 7-membered monocyclic heterocyclic ring
which may optionally comprise an additional nitrogen
or oxygen ring atom and/or may optionally have one
or two alkyl of 1 to 4 carbon atoms, a hydroxyalkyl
of 1 to 4 carbon atoms, and alkoxy of 1 to 4 carbon
atoms, a benzyl or methyl-benzyl substituents attached
to a ring atom, and non-toxic, pharmacologically acceptable acid addition
salts thereof.

The compounds of the Formula I above may be prepared by reacting a 5-haloacetyl-5,10-dihydro-11H-dibenzo[b,e][1,4]diazepin-11-one of the formula

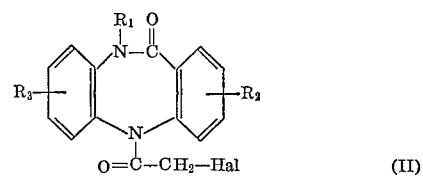

wherein $R_1$, $R_2$ and $R_3$ have the same meanings as in Formula I, and Hal is halogen, with a heterocyclic amine of
the formula

wherein

has the same meanings as in Formula I, in accordance
with known methods.

The reaction is advantageously carried out in the presence of an inert organic solvent at elevated temperatures,
preferably at the boiling point of the particular solvent
which is employed. Preferred solvents are ethanol, acetone
and dioxane; however, aromatic hydrocarbons, such as
benzene or toluene, may also be used. The reaction may
also optionally be carried out in the presence of an acid-binding agent, i.e. a compound which is capable of tying
up or neutralizing the hydrogen halide released by the
reaction but does not participate in the reaction itself,
such as an alkali metal carbonate or alkali metal bicarbonate. Moreover, if the secondary heterocyclic amine
of the Formula III is provided in sufficient excess over
the amount required for reaction with the dibenzodiazepinone of the Formula II, the excess amine may itself act
as the acid-binding agent, so that the addition of a separate acid-binding agent is not necessary.

In the preparation of a compound of the Formula I
wherein the heterocyclic amino radical attached to the 5-acetyl substituent is unsubstituted piperazino, it is advantageous to prepare first a compound of the Formula I
wherein the said heterocyclic amino moiety is 4-benzyl-piperazino, and thereafter hydrogenate this compound
pursuant to known methods, such as with hydrogen in the
presence of palladized activated charcoal, to remove the
benzyl substituent.

The compounds embraced by Formula I are organic
bases and therefore form acid addition salts with inorganic or organic acids. If desired, a compound of the Formula I may be converted into an acid addition salt thereof
by known methods, such as by dissolving the free base in
a solvent, and acidifying the solution with the desired
acid. Examples of non-toxic, pharmacologically acceptable
acid addition salts are those formed with hydrochloric
acid, hydrobromic acid, sulfuric acid, phosphoric acid,
tartaric acid, fumaric acid, citric acid, maleic acid, succinic acid, oxalic acid, 8-chlorotheophylline or the like.

The starting compounds of the Formula II above are
either described in the literature or may be prepared
pursuant to methods described in the literature [A. M.
Monro et al., J. Med. Chem. 6, 255 (1963)]. A compound
of the Formula II prepared in this manner need not be
isolated and purified; it may be used in the raw state for the preparation of the corresponding end product of the Formula I.

The following examples further illustrate the present invention and will enable others skilled in the art to understand it more completely. It should be understood, however, that the invention is not limited solely to the particular examples given below.

EXAMPLE 1

5,10 - dihydro - 5-[(N'-methyl-piperazino)-acetyl]-11H-dibenzo[b,e][1,4]diazepin - 11 - one and its dihydrochloride A mixture of 10.0 gm. of 5-chloroacetyl-5,10-dihydro-11H - dibenzo[b,e][1,4]diazepin-11-one, 15 cc. of N-methyl-piperazine and 300 cc. of absolute benzene was refluxed for 18 hours, and then the reaction solution was evaporated in vacuo. The residue, raw 5,10-dihydro-5-[(N' - methyl-piperazino)-acetyl] - 11H - dibenzo[b,e]-[1,4]diazepin-11-one, was dissolved in aqueous 20% hydrochloric acid, the solution was evaporated in vacuo and the residue was recrystallized from isopropanol/water, yielding 33% of theory of the dihydrochloride, M.P. 220° C. (decomposition), of the formula

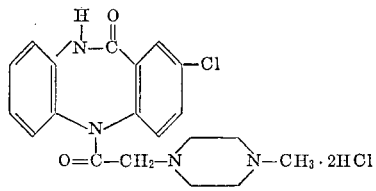

Analysis.—$C_{20}H_{24}Cl_2N_4O_2$; mol wt. 423.4: Calculated (percent): C, 56.74; H, 5.71; N, 13.23; Cl, 16.75. Found (percent): C, 57.00; H, 5.92; N, 12.72; Cl, 16.40.

EXAMPLE 2

2 - chloro - 5,10 - dihydro-5-[(N'-methyl-piperazino)-acetyl]-11H-dibenzo[b,e][1,4]diazepin-11-one and its dihydrochloride A solution of 7.35 gm. of 2-chloro-5,10-dihydro-11H-dibenzo[b,e][1,4]diazepin-11-one in 400 cc. of absolute toluene was admixed with 22.6 gm. of chloroacetyl chloride, and the mixture was refluxed for three hours. Thereafter, the reaction solution was evaporated in vacuo, the residue was dissolved in a small amount of toluene by heating, the solution was allowed to cool, and the crystalline 2 - chloro-5-chloroacetyl-5,10-dihydro-11H-dibenzo[b,e][1,4]diazepin-11-one precipitated thereby was collected and dissolved in 50 cc. of absolute dioxane. While stirring, 10.0 gm. of N-methyl-piperazine were added dropwise to the dioxane solution at 50° C., and then the mixture was refluxed for three hours. Thereafter, the reaction solution was evaporated in vacuo, and the residue, raw 2 - chloro-5,10-dihydro-5-[(N'-methyl-piperazino)-acetyl] - 11H-dibenzo[b,e][1,4]diazepin-11-one, was admixed with a mixture of aqueous 20% hydrochloric acid and ethanol (1:1), whereby a precipitate separated out, which was recrystallized from a mixture of aqueous 10% hydrochloric acid and ethanol (2:3) in the presence of activated charcoal, yielding 78% of theory of the dihydrochloride, M.P. 225–228° C. (decomposition), of the formula

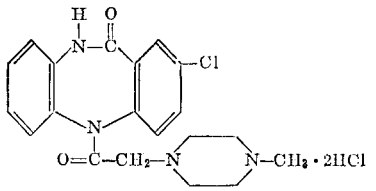

Analysis.—$C_{20}H_{23}Cl_3N_4O_2$; mol wt. 457.8: Calculated (percent): C, 52.47; H, 5.07; N, 12.24; Cl, 23.23. Found (percent): C, 52.45; H, 5.26; N, 11.92; Cl, 23.15.

EXAMPLE 3

3-chloro-5,10-dihydro-5-[(N'-methyl-piperazino)-acetyl]-11H-dibenzo[b,e][1,4]diazepin-11-one and its dihydrochloride The free base was prepared in a manner analogous to that described in Example 2, namely by first reacting 12.25 gm. of 3-chloro-5,10-dihydro - 11H - dibenzo[b,e] [1,4]diazepin-11-one with 22.6 gm. of chloroacetyl chloride in 400 cc. of absolute toluene, and then reacting the 3-chloro-5-chloroacetyl - 5,10 - dihydro-11H-dibenzo[b,e] [1,4]diazepin-11-one formed thereby with 20.0 gm. of N-methyl-piperazine in 200 cc. of absolute dioxane. The dihydrochloride was obtained by acidifying the raw base with ethereal hydrochloric acid and recrystallizing the salt from a mixture of ethanol and dimethylformamide (5:1) which was acidified with a small amount of aqueous 20% hydrochloric acid. 57% of theory of the dihydrochloride, M.P. 223–225° C. (decomposition), of the formula

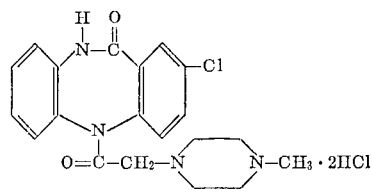

were obtained.

Analysis.—$C_{20}H_{23}Cl_3N_4O_2$; mol wt. 457.8: Calculated (percent): C, 52.47; H, 5.07; N, 12.24; Cl, 23.23. Found (percent): C, 52.20; H, 5.29; N, 11.95; Cl, 23.05.

EXAMPLE 4

8-chloro-5,10-dihydro-5-[(N'-methyl-piperazino)-acetyl]-11H-dibenzo[b,e][1,4]diazepin-11-one This compound was prepared in a manner analogous to that described in Example 2, namely by first reacting 10.0 gm. of 8-chloro-5,10-dihydro-11H-dibenzo[b,e][1,4] diazepin-11-one with 22.6 gm. of chloroacetyl chloride in 300 cc. of absolute toluene, and then reacting the 8-chloro-5 - chloroacetyl - 5,10-dihydro-11H-dibenzo[b,e][1,4]diazepin-11-one formed thereby with 20.0 gm. of N-methylpiperazine in 200 cc. of absolute dioxane. After distilling the dioxane out of the reaction solution, the residue was dissolved in water, the aqueous solution was made alkaline with dilute ammonia, and the alkaline solution was extracted with chloroform. The chloroform extract solution was evaporated, and the residue was crystallized from methanol in the presence of activated charcoal and then recrystallized from a mixture of ethanol and isopropanol (1:1), yielding 78% of theory of the compound, M.P. 199–201° C., of the formula

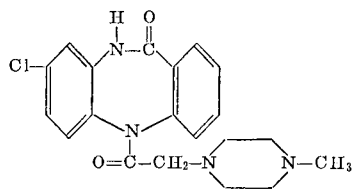

Analysis.—$C_{20}H_{21}Cl_2N_4O_2$; mol wt. 384.9: Calculated (percent): C, 62.41; H, 5.50; N, 14.56%; Cl, 9.21. Found (percent): C, 62.30%; H, 5.33; N, 14.56; Cl, 9.39.

EXAMPLE 5

2 - chloro - 5,10-dihydro-10-methyl-5-[(N'-methyl-piperazino)-acetyl] - 11H - dibenzo[b,e][1,4]diazepin-11-one and its dihydrochloride 7.4 gm. of 2 - chloro - 5,10-dihydro-10-methyl-11H-dibenzo[b,e][1,4]diazepin-11 - one, M.P. 213–214° C., prepared by reacting the 10-potassium salt of 2-chloro-5,10 - dihydro - 11H - dibenzo[b,e][1,4]diazepin-11-one with methyl iodide in dioxane, and 11.3 gm. of chloroacetyl chloride were refluxed for four hours in 200 cc. of absolute toluene. Thereafter, the reaction solution was evaporated in vacuo, and the residue was recrystallized from xylene. 8.4 gm. of the thus obtained 2-chloro-5-chloroacetyl - 5,10 - dihydro - 10 - methyl-11H-dibenzo[b,e][1,4]diazepin - 11 - one, M.P. 198–200° C., were refluxed for five hours with 10.0 gm. of N-methyl-piperazine in 100 cc. of absolute dioxane. Thereafter, the reaction solution was evaporated in vacuo, the residue was admixed with aqueous ammonia, and the mixture was extracted with chloroform. The chloroform extract solution was washed with water, dried with sodium sulfate and evaporated in vacuo. The residue, 2 - chloro - 5,10-dihydro - 10 - methyl - 5 - [(N'-methyl-piperazino)-acetyl] - 11H - dibenzo[b,e,][1,4]diazepin - 11 - one, was dissolved in ethanol, the solution was acidified with ethereal hydrochloric acid, and the precipitate formed thereby was recrystallized from ethanol containing a little aqueous hydrochloric acid. 90% of theory of the dihydrochloride, M.P. 246–248° C., of the formula

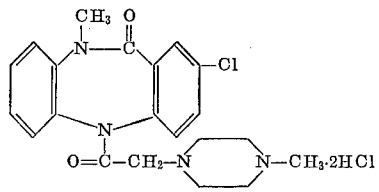

were obtained.

*Analysis.*—$C_{21}H_{25}Cl_3N_4O_2$; mol wt. 471.8: Calculated (percent): C, 53.46; H, 5.35; N, 11.87; Cl, 22.54. Found (percent): C, 53.20; H, 5.52; N, 11.55; Cl, 22.65.

EXAMPLE 6

10 - n - butyl - 2 - chloro - 5,10 - dihydro-5-[(N'-methyl-piperazino)-acetyl] - 11H - dibenzo[b,e][1,4]diazepin-11 - one and its dihydrochloride The free base was prepared in a manner analogous to that described in Example 5, namely, by first reacting 10 - n - butyl - 2 - chloro - 5,10 - dihydro-11H-dibenzo[b,e][1,4]-diazepin - 11 - one (M.P. 165° C.) with chloroacetyl chloride, and then reacting the 10 - n - butyl-2-chloro - 5 - chloroacetyl - 5,10 - dihydro-11H-dibenzo[b,e][1,4]diazepin-11-one, M.P. 170° C., formed thereby with N-methyl-piperazine in dioxane. The free base was dissolved in ethanol, the solution was acidified with ethereal hydrochloric acid, and the precipitate formed thereby was recrystallized from ethanol containing a little aqueous hydrochloric acid, yielding 70% of theory of the dihydrochloride, M.P. 250° C. (decomp.), of the formula

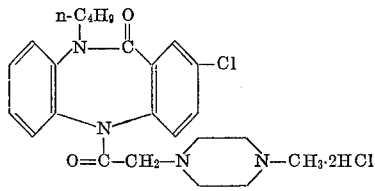

*Analysis.*—$C_{24}H_{31}Cl_3N_4O_2$; mol wt. 513.9: Calculated (percent): C, 56.09; H, 6.08; N, 10.90; Cl, 20.70. Found (percent): C, 56.10; H, 6.23; N, 10.85; Cl, 20.80.

EXAMPLE 7

5 - [(N'-benzyl-piperazino)-acetyl] - 5,10 - dihydro-11H-dibenzo[b,e][1,4]diazepin - 11 - one and its dihydrochloride A mixture of 4.3 gm. of 5-chloroacetyl-5,10-dihydro-11H-dibenzo[b,e][1,4]diazepin - 11 - one, 3 gm. of N-benzylpiperazine and 200 cc. of absolute benzene was refluxed for 18 hours. Thereafter, the hot solution was decanted, the solvent was distilled off in vacuo, the residue, 5-[(N'-benzyl-piperazino)-acetyl] - 5,10 - dihydro-11H-dibenzo[b,e][1,4]diazepin - 11 - one, was dissolved in dilute hydrochloric acid, and the solution was evaporated in vacuo. The residue was recrystallized from aqueous 90% ethanol, yielding 35% of theory of the dihydrochloride, M.P. 218–220° C. (decomp.), of the formula

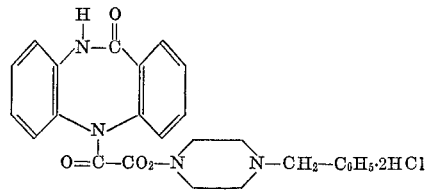

*Analysis.*—$C_{26}H_{28}Cl_2N_4O_2$; mol wt. 499.5: Calculated (percent): C, 62.52; H, 5.65; N, 11.22; Cl, 14.20. Found (percent): C, 62.50; H, 5.92; N, 11.08; Cl, 14.03.

EXAMPLE 8

5,10 - dihydro - 5 - (piperazino-acetyl) - 11H - dibenzo[b,e][1,4]diazepin - 11 - one and its dihydrochloride A mixture of 2.2 gm. of 5 - [(N'-benzyl-piperazino)-acetyl] - 5,10 - dihydro - 11H - dibenzo[b,e][1,4]diazepin-11 - one (prepared by dissolving the dihydrochloride obtained in Example 7 in water, making the solution alkaline with aqueous 45% sodium hydroxide, extracting the alkaline solution with methylene chloride and evaporating the solvent from the extract solution), 25 cc. of methanol, 0.5 cc. of glacial acetic acid and 0.5 gm. of 10% palladized charcoal was hydrogenated at 60° C. and 50 atmospheres pressure. The calculated amount of hydrogen had been absorbed after three hours. Thereafter, the catalyst was filtered off, the filtrate was evaporated in vacuo, the residue, 5,10 - dihydro-5-(piperazino-acetyl)-11H - dibenzo[b,e][1,4]diazepin - 11 - one, was dissolved in aqueous 20% hydrochloric acid, the acid solution was again evaporated in vacuo, and the residue was recrystallized from aqueous acetone, yielding 70% of theory of the dihydrochloride, M.P. 245–247° C. (decomp.) of the formula

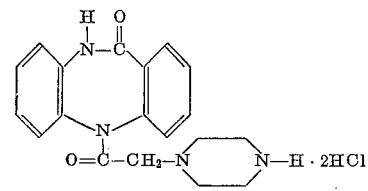

*Analysis.*—$C_{19}H_{22}Cl_2N_4O_2$; mol wt. 409.3: Calculated (percent): C, 55.75; H, 5.42; Cl, 17.32. Found (percent): C, 56.00; H, 5.71; Cl, 17.15.

EXAMPLE 9

5,10-dihydro-5-[(N'-(β-hydroxyethyl) - piperazino) - acetyl]-11H-dibenzo[b,e][1,4]diazepin-11-one and its dihydrochloride A mixture of 4.3 gm. of 5-chloroacetyl-5,10-dihydro-11H-dibenzo[b,e][1,4]diazepin-11-one, 10 cc. of N- (β-hydroxyethyl)-piperazine and 200 cc. of absolute benzene was refluxed for 18 hours. Thereafter, activated charcoal was added to the solution, the mixture was filtered while hot, and the filtrate was evaporated in vacuo. The residue, 5,10-dihydro-5-[(N' - (β - hydroxyethyl)-piperazino)-acetyl]-11H-dibenzo[b,e][1,4]diazepin-11-one, was dissolved in dilute hydrochloric acid, the solution was evaporated in vacuo, and the residue was recrystallized from aqueous acetone, yielding 25% of theory of the dihydrochloride, M.P. 213–215° C. (decomp.), of the formula

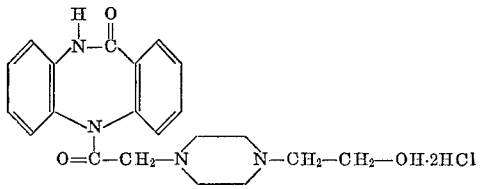

*Analysis.*—C₂₁H₂₆Cl₂N₄O₃; mol wt. 453.4; Calculated (percent): C, 55.63; H, 5.78; N, 12.36. Found (percent): C, 55.90; H, 6.02; N, 12.36.

EXAMPLE 10

5,10-dihydro-5-[(N'-(o-methyl-benzyl) - piperazino)-acetyl]-11H-dibenzo[b,e][1,4]diazepin-11-one and its dihydrochloride A mixture of 4.3 gm. of 5-chloroacetyl-5,10-dihydro-11H - dibenzo[b,e][1,4]diazepin-11-one, 5 cc. of N - (o-methyl-benzyl)-piperazine and 200 cc. of absolute benzene was refluxed for 18 hours. Thereafter, activated charcoal was added to the reaction solution, the mixture was filtered while hot, and the filtrate was evaporated in vacuo. The residue was dissolved in ethanol, ether was added to the solution, and the crystals precipitated thereby were filtered off. The filtrate was evaporated in vacuo, the residue, 5,10-dihydro-5-[(N'-(o - methyl-benzyl) - piperazino)-acetyl] - 11H - dibenzo[b,e][1,4]diazepin-11-one, was dissolved in aqueous dilute hydrochloric acid, the solution was evaporated in vacuo, and the residue was recrystallized from aqueous acetone, yielding 25% of theory of the dihydrochloride, M.P. 222–223° C. (decomp.), of the formula

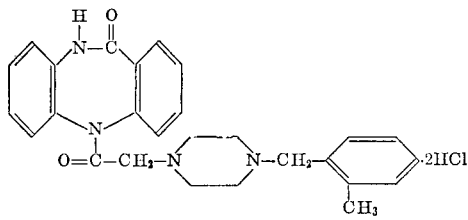

*Analysis.*—C₂₇H₃₀Cl₂N₄O₂; mol wt. 513.5; Calculated (percent): N, 10.91; Cl, 13.81. Found (percent): N, 10.62; Cl, 13.35.

EXAMPLE 11

5,10-dihydro-5-(piperidino-acetyl)-11H-dibenzo[b,e][1,4]diazepin-11-one

A mixture of 4.2 gm. of 5-chloroacetyl-5,10-dihydro-11H-dibenzo[b,e][1,4]diazepin-11-one, 20 cc. of piperidine and 200 cc. of absolute benzene was refluxed for 18 hours. Thereafter, activated charcoal was added to the reaction solution, the mixture was filtered while hot, the filtrate was evaporated in vacuo, and the residue was recrystallized from ethanol/ether, yielding 65% of theory of the compound, M.P. 198–199° C., of the formula

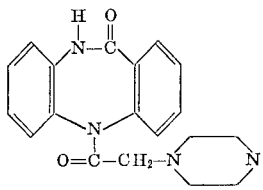

*Analysis.*—C₂₀H₂₁N₃O₂; mol wt. 335.4; Calculated (percent): C, 71.62; H, 6.31; N, 12.53. Found (percent): C, 71.60; H, 6.45; N, 12.35.

EXAMPLE 12

5,10-dihydro-5-(morpholino-acetyl)-11H-dibenzo[b,e][1,4]diazepin-11-one

A mixture of 4.2 gm. of 5-chloroacetyl-5,10-dihydro-11H-dibenzo[b,e][1,4]diazepin-11-one, 15 cc. of morpholine and 200 cc. of absolute benzene was refluxed for 18 hours. Thereafter, the reaction solution was allowed to cool, the morpholine hydrochloride precipitated thereby was filtered off, and the filtrate was evaporated in vacuo. The residue was dissolved in methylene chloride, the solution was washed with water and then evaporated, and the residue was recrystallized from ethyl acetate/cyclohexane, yielding 80% of theory of the compound, M.P. 188–189° C., of the formula

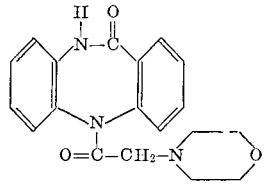

*Analysis.*—C₁₉H₁₉N₃O₃; mol wt. 337.4; Calculated (percent): C, 67.64; H, 5.68; N, 12.45. Found (percent): C, 67.10; H, 5.82; N, 12.20.

EXAMPLE 13

5,10-dihydro-5-(pyrrolidino-acetyl)-11H-dibenzo[b,e][1,4]diazepin-11-one

A mixture of 4.2 gm. of 5-chloroacetyl-5,10-dihydro-11H-dibenzo[b,e][1,4]diazepin - 11 - one, 15 cc. of pyrrolidine and 200 cc. of absolute benzene was refluxed for 18 hours. Thereafter, activated charcoal was added to the reaction solution, the mixture was filtered while hot, and the filtrate was evaporated in vacuo. The residue was dissolved in methylene chloride, the solution was washed with dilute sodium hydroxide and water, evaporated in vacuo, the residue was dissolved in a small amount of acetone, the solution was poured into a neutral silica gel column which was then eluted with acetone, and the acetone eluate was evaporated in vacuo. The residue had a melting point of 100–105° C. and was identified to be the compound of the formula

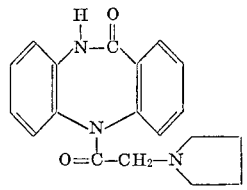

The yield was 30% of theory.

*Analysis.*—C₁₉N₁₉N₃O₂: mol wt. 321.4: Calculated (percent): C, 71.01; H, 5.96; N, 13.07. Found (percent): C, 70.80; H, 6.26; N, 13.18.

EXAMPLE 14

1,10-dihydro-5-[(hexahydro - 1H - azepin - 1 - yl) - acetyl-11H-dibenzo[b,e][1,4]diazepin-11-one and its fumarate A mixture of 4.2 gm. of 5-chloroacetyl-5,10-dihydro-11H-dibenzo[b,e][1,4]diazepin-11-one, 15 cc. of hexahydroazepine (hexamethyleneimine) and 200 cc. of absolute benzene was refluxed for 18 hours. Thereafter, the precipitated hexahydroazepine hydrochloride was separated by vacuum filtration, and the filtrate was evaporated in vacuo. The residue, 5,10-dihydro-5-[(hexahydro-1H - azepin - 1 - yl) - acetyl] - 11H - dibenzo[b,e][1,4]diazepin-11-one, was dissolved in hot isopropanol, and the hot solution was admixed with a hot saturated solution of fumaric acid in isopropanol. The mixture was allowed to cool, and the crystalline precipitate which separated out was collected. 45% of theory of the fumarate, M.P. 222–224° C. (decomp.), of the formula

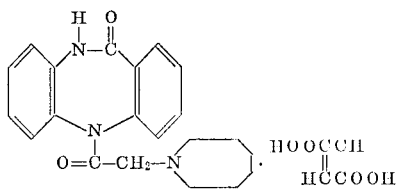

were obtained.

*Analysis.*—C₂₁H₂₃N₃O₂·C₄H₄O₄; mol wt. 465.5: Calculated (percent): C, 64.51; H, 5.85; N, 9.03. Found (percent): C, 64.20; H, 6.08; N, 9.20.

EXAMPLE 15

10-n-butyl-2-chloro-5,10-dihydro - 5 - [(N' - (β - hydroxyethyl) - piperazino) - acetyl] - 11H - dibenzo[b,e][1,4]diazepin-11-one and its dihydrochloride A mixture of 3.0 gm. of 10-n-butyl-2-chloro-5-chloroacetyl-5,10-dihydro-11H - dibenzo[b,e][1,4]diazepin - 11-one, 3.9 gm. of N-(β-hydroxyethyl)-piperazine and 80 cc. of dioxane was refluxed for five hours. Thereafter, the solvent was distilled off, the residue was made alkaline with ammonia, and the alkaline solution was extracted with chloroform. The chloroform extract solution was washed with water, dried over sodium sulfate and evaporated in vacuo. The residue, 10-n-butyl-2-chloro-5,10-dihydro-5-[(N' - (β - hydroxyethyl) - piperazino) - acetyl]-11H-dibenzo[b,e][1,4]diazepin-11-one, was dissolved in ethanol, the solution was acidified with concentrated hydrochloric acid, and the precipitate formed thereby was collected and recrystallized three times from isopropanol containing a small amount of concentrated hydrochloric acid. 65% of theory of the dihydrochloride, M.P. 245° C., of the formula

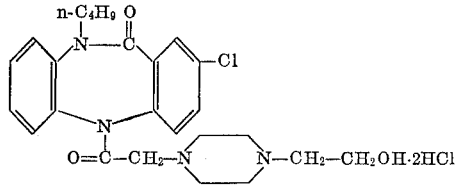

were obtained.

*Analysis.*—$C_{25}H_{23}Cl_3N_4O_3$; mol wt. 543.9: Calculated (percent): C, 55.21; H, 6.12; N, 10.30; Cl, 19.55. Found (percent): C, 54.90; H, 6.28; N, 10.05; Cl, 19.30.

EXAMPLE 16

Using a procedure analogous to that described in Example 11, 54% of theory of 5-(pyrrolidino-acetyl)-10-methyl-5,10 - dihydro - 11H - dibenzo[b,e][1,4]diazepin-11-one, M.P. 135–137° C., were obtained from 5-chloroacetyl-5,10-dihydro-10 - methyl - 11H - dibenzo[b,e][1,4]diazepin-11-one and pyrrolidine in benzene.

*Analysis.*—$C_{20}H_{21}N_3O_2$; mol wt. 335.4: Calculated (percent): C, 71.62; H, 6.31; N, 12.53. Found (percent): C, 71.30; H, 6.36; N, 12.23.

EXAMPLE 17

2-chloro-5,10-dihydro-5-(pyrrolidino-acetyl)-11H-dibenzo[b,e][1,4]diazepin-11-one A mixture of 9.7 gm. of 2-chloro-5-chloroacetyl-5,10-dihydro-11H - dibenzo[b,e][1,4]diazepin - 11 - one [M.P. 218–219° C. (decomp.)], 7.1 gm. of pyrrolidine and 150 cc. of dioxane was refluxed for three hours. Thereafter, the solvent was evaporated in vacuo, the residue was admixed with an excess of dilute aqueous ammonia, and the alkaline mixture was extracted with chloroform. The chloroform extract solution was washed with water, dried over sodium sulfate and evaporated in vacuo. The residue was recrystallized from cyclohexane, yielding 50% of theory of 2-chloro-5,10-dihydro - 5 - (pyrrolidino-acetyl)-11H-dibenzo[b,e][1,4]diazepin-11-one, M.P. 165–167° C.

*Analysis.*—$C_{19}H_{18}ClN_3O_2$; mol wt. 355.8: Calculated (percent): C, 64.14; H, 5.10; N, 11.81; Cl, 9.96. Found (percent): C, 64.20; H, 5.27; N, 12.05; Cl, 9.92.

EXAMPLE 18

Using a procedure analogous to that described in Example 17, 2-chloro-5-(pyrrolidino-acetyl)-10 - methyl-5,10-dihydro-11H-dibenzo[b,e][1,4]diazepin-11-one were obtained from 2-chloro-5-chloroacetyl-5,10 - dihydro - 10-methyl-11H-dibenzo[b,e][1,4]diazepin - 11 - one and pyrrolidine in dioxane.

The free base was dissolved in isopropanol, the solution was acidified with ethereal hydrochloric acid, and the precipitate formed thereby was collected and recrystallized from isopropanol, yielding 59% of theory of the dihydrochloride, M.P. 261–263° C. (decomp.).

*Analysis.*—$C_{20}H_{21}Cl_2N_3O_2$; mol. wt. 406.3: Calculated (percent): C, 59.12; H, 5.21; N, 10.34; Cl, 17.45. Found (percent): C, 58.90; H, 5.22; N, 10.10; Cl, 17.15.

EXAMPLE 19

Using a procedure analogous to that described in Example 11, 5-(piperidino-acetyl)-10-methyl-5,10-dihydro-11H-dibenzo[b,e][1,4]diazepin - 11 - one were obtained from 5 - chloroacetyl - 5,10 - dihydro-10-methyl-11H-dibenzo[b,e][1,4]diazepin - 11 - one and piperidine in benzene.

The residue of the evaporated filtrate was dissolved in methylene chloride, and the solution was washed with water and again evaporated. The residue was dissolved in dilute hydrochloric acid, the solution was evaporated in vacuo, and the residue was recrystallized from ethanol/ethylacetate, yielding 65% of theory of the hydrochloride, M.P. 253–255° C. (decomp.).

*Analysis.*—$C_{21}H_{24}ClN_3O_2$; mol. wt. 385.9: Calculated (percent): N, 10.89; Cl, 9.19. Found (percent): N, 10.65; Cl, 9.09.

EXAMPLE 20

Using a procedure analogous to that described in Example 17, 71% of theory of 2-chloro - 5 - (piperidinoacetyl)-5,10-dihydro - 11H - dibenzo[b,e][1,4]diazepin-11-one, M.P. 189–190° C. (from ethanol), were obtained from 2-chloro - 5 - chloroacetyl-5,10-dihydro-11H-dibenzo[b,e][1,4]diazepin - 11 - one and piperidine in dioxane.

*Analysis.*—$C_{20}H_{20}ClN_3O_2$; mol. wt. 369.8: Calculated (percent): C, 64.95; H, 5.45; N, 11.36; Cl, 9.59. Found (percent): C, 65.10; H, 5.21; N, 11.63; Cl, 9.62.

EXAMPLE 21

Using a procedure analogous to that described in Example 17, 2-chloro-5-(piperidino-acetyl) - 10 - methyl-5,10 - dihydro - 11H - dibenzo[b,e][1,4]diazepin-11-one was obtained from 2-chloro-5-chloroacetyl-5,10-dihydro-10-methyl - 11H - dibenzo[b,e][1,4]diazepin-11-one and piperidine in dioxane.

The hydrochloride, prepared as described in Example 18, had a melting point of 263–268° C. (decomp.) after recrystallization from isopropanol. The yield was 88% of theory.

*Analysis.*—$C_{21}H_{23}Cl_2N_3O_2$; mol. wt. 420.3: Calculated (percent): C, 60.01; H, 5.51; N, 10.00; Cl, 16.87. Found (percent): C, 60.00; H, 5.36; N, 10.03; Cl, 17.02.

EXAMPLE 22

Using a procedure analogous to that described in Example 19, 5-(morpholino-acetyl)-10-methyl - 5,10 - dihydro - 11H - dibenzo[b,e][1,4]diazepin - 11 - one was obtained from 5-chloroacetyl - 5,10 - dihydro-10-methyl-11H - dibenzo[b,e][1,4]diazepin-11-one and morpholine in benzene.

The hydrochloride had a melting point of 160–165° C. (decomp.) after recrystallization from isopropanol/ether. The yield was 83% of theory.

*Analysis.*—$C_{20}H_{22}ClN_3O_3$; mol. wt. 387.9: Calculated (percent): C, 61.93; H, 5.72; N, 10.83; Cl, 9.14. Found (percent): C, 61.80; H, 6.21; N, 10.75; Cl, 9.17.

EXAMPLE 23

Using a procedure analogous to that described in Example 17, 71% of theory of 2-chloro-5-(morpholinoacetyl)-5,10-dihydro - 11H - dibenzo[b,e][1,4]diazepin-11-one, M.P. 226–228° C. (from ethanol), were obtained from 2 - chloro-5-chloroacetyl - 5,10 - dihydro-11H-dibenzo[b,e][1,4]diazepin - 11 - one and morpholine in dioxane.

*Analysis.*—$C_{19}H_{18}ClN_3O_3$; mol. wt. 371.8: Calculated (percent): C, 61.38; H, 4.88; N, 11.30; Cl, 9.54. Found (percent): C, 61.30; H, 4.89; N, 11.28; Cl, 9.62.

EXAMPLE 24

Using a procedure analogous to that described in Example 17, 50% of theory of 2-chloro-5-(morpholinoacetyl) - 10 - methyl - 5,10 - dihydro-11H-dibenzo[b,e][1,4]diazepin-11-one, M.P. 147–149° C. (from benzene/ether), were obtained from 2-chloro - 5 - chloroacetyl-5,10-dihydro - 10 - methyl - 11H - dibenzo[b,e][1,4]diazepin-11-one and morpholine in dioxane.

*Analysis.*—$C_{20}H_{20}ClN_3O_3$; mol. wt. 385.9: Calculated (percent): C, 62.26; H, 5.22; N, 10.89; Cl, 9.19. Found (percent): C, 62.40; H, 5.34; N, 10.77; Cl, 9.28.

EXAMPLE 25

Using a procedure analogous to that described in Example 19, 5 - [(N'-methyl-piperazino)-acetyl]-10-methyl-5,10 - dihydro - 11H - dibenzo[b,e][1,4]diazepin-11-one was obtained from 5-chloroacetyl-5,10-dihydro-10-methyl-11H-dibenzo[b,e][1,4]diazepin - 11 - one and N-methyl-piperazine in benzene.

The residue of the evaporated methylene chloride solution was dissolved in isopropanol, and the solution was admixed with a saturated solution of fumaric acid in isopropanol. The mixture was evaporated in vacuo, and the residue was recrystallized from ethanol/acetonitrile, yielding 72% of theory of the difumarate, M.P. 166–168° C.

*Analysis.*—$C_{21}H_{24}N_4O_2 \cdot 2C_4H_4O_4$; mol. wt. 596.6: Calculated (percent): C, 58.38; H, 5.41; N, 9.39. Found (percent): C, 58.30; H, 5.59; N, 9.17.

EXAMPLE 26

Using a procedure analogous to that described in Example 17, 2-chloro - 5 - [(N'-methyl-piperazino)-acetyl]-10 - ethyl - 5,10 - dihydro-11H-dibenzo[b,e][1,4]diazepin-11-one was obtained from 2-chloro - 5 - chloroacetyl-5,10-dihydro - 10 - ethyl - 11H - dibenzo[b,e][1,4]diazepin-11-one (M.P. 155–157° C.) and N-methyl-piperazine in dioxane.

The dihydrochloride, prepared as described in Example 18, had a melting point of 238–240° C. (decomp.) after recrystallization from ethanol containing a small amount of hydrochloric acid. The yield was 77% of theory.

*Analysis.*—$C_{22}H_{27}Cl_3N_4O_2$; mol. wt. 485.8: Calculated (percent): C, 54.39; H, 5.60; N, 11.53. Found (percent): C, 54.40; H, 5.51; N, 11.55.

EXAMPLE 27

Using a procedure analogous to that described in Example 17, 62% of theory of 2 - chloro-5-[(N'-methyl-piperazino)-acetyl]10-n-propyl - 5,10 - dihydro-11H-dibenzo[b,e][1,4]diazepin-11-one, M.P. 66–69° C. (from aqueous 50% methanol) were obtained from 2-chloro-5-chloroacetyl - 5,10 - dihydro-10-n-propyl - 11H - dibenzo[b,e][1,4]diazepin-11-one (M.P. 169–171° C.) and N-methyl-piperazine in dioxane.

*Analysis.*—$C_{23}H_{27}ClN_4O_2$; mol. wt. 426.9: Calculated (percent): C, 64.70; H, 6.38; N, 13.12; Cl, 8.30. Found (percent): C, 64.40; H, 6.36; N, 13.05; Cl, 8.13.

EXAMPLE 28

Using a procedure analogous to that described in Example 17, 85% of theory of 3-chloro-5-[(N'-methyl-piperazino)-acetyl] - 10 - methyl - 5,10 - dihydro-11H-dibenzo[b,e][1,4]diazepin - 11 - one, M.P. 122–123° C. (from cyclohexane), were obtained from 3-chloro-5-chloroacetyl - 5,10 - dihydro-10-methyl - 11H - dibenzo[b,e][1,4-diazepin-11-one (M.P. 171–173° C.) and N-methyl-piperazine in dioxane.

*Analysis.*—$C_{21}H_{23}ClN_4O_2$; mol. wt. 398.9: Calculated (percent): C, 63.23; H, 5.81; N, 14.05; Cl, 8.89. Found (percent): C, 63.10; H, 5.74; N, 13.80; Cl, 8.96.

EXAMPLE 29

Using a procedure analogous to that described in Example 19, 5-[(N'-ethyl - piperazino)-acetyl]-5,10-dihydro-11H-dibenzo[b,e][1,4]diazepin-11-one was obtained from 5-chloroacetyl - 5,10 - dihydro - 11H - dibenzo[b,e][1,4]diazepin-11-one and N-ethyl-piperazine in benzene.

The dihydrochloride had a melting point of 289–290° C. (decomp.) after recrystallization from aqueous isopropanol. The yield was 41% of theory.

*Analysis.*—$C_{21}H_{26}Cl_2N_4O_2$; mol. wt. 437.4: Calculated (percent): C, 57.69; H, 5.99; N, 12.81; Cl, 16.21. Found (percent): C, 57.10; H, 5.97; N, 12.70; Cl, 15.90.

EXAMPLE 30

Using a procedure analogous to that described in Example 11, 41% of theory of 5-[N'-(β-hydroxyethyl)-piperazino)-acetyl] - 10 - methyl - 5,10 - dihydro-11H-dibenzo[b,e][1,4]diazepin-11-one, M.P. 80–82° C., were obtained from 5-chloroacetyl - 5,10 - dihydro - 10-methyl-11H-dibenzo[b,e][1,4]diazepin-11-one and N-(β-hydroxyethyl)-piperazine in benzene. The residue of the evaporated filtrate was dissolved in methylene chloride, and the solution was washed with water and evaporated.

*Analysis.*—$C_{22}H_{26}N_4O_3$; mol. wt. 394.5: Calculated (percent): C, 66.99; H, 6.64; N, 14.20. Found (percent): C, 66.80; H, 6.82; N, 14.12.

EXAMPLE 31

Using a procedure analogous to that described in Example 25, 5-[(N'-(o-methyl-benzyl)-piperazino)-acetyl]-10-methyl - 5,10 - dihydro - 11H - dibenzo[b,e][1,4]diazepin-11-one was obtained from 5-chloroacetyl-5,10-dihydro-10-methyl - 11H - dibenzo[b,e][1,4]diazepin-11-one and N-(o-methyl-benzyl)-piperazine in benzene.

The fumarate had a melting point of 198–201° C. (decomp.) after recrystallization from isopropanol. The yield was 83% of theory.

*Analysis.*—$C_{28}H_{30}N_4O_2 \cdot C_4H_4O_4$; mol. wt. 570.7: Calculated (percent): C, 67.35; H, 6.01; N, 9.82. Found (percent): C, 66.80; H, 6.02; N, 9.84.

EXAMPLE 32

Using a procedure analogous to that described in Example 19, 5-[(N'-ethyl-piperazino)-acetyl] - 2 - chloro-5,10-dihydro - 11H - dibenzo[b,e][1,4]diazepin-11-one was obtained from 2-chloro - 5 - chloroacetyl - 5,10 - dihydro-11H-dibenzo[b,e][1,4]diazepin-11-one and N-ethyl-piperazine in dioxane.

The dihydrochloride, recrystallized from ethanol containing hydrochloric acid, decomposed at temperatures above 270° C. The yield was 80% of theory.

*Analysis.*—$C_{21}H_{25}Cl_3N_4O_2$; mol. wt. 471.8: Calculated (percent): C, 53.46; H, 5.34; N, 11.88; Cl, 22.54. Found (percent): C, 52.90; H, 5.68; N, 11.78; Cl, 22.30.

EXAMPLE 33

Using a procedure analogous to that described in Example 25, 5-[(N'-methyl-piperazino)-acetyl] - 10 - ethyl-5,10-dihydro - 11H - dibenzo[b,e][1,4]diazepin-11-one was obtained from 5-chloroacetyl - 5,10 - dihydro-10-ethyl - 11H - dibenzo[b,e][1,4]diazepin-11-one and N-methyl-piperazine in benzene.

The difumarate, recrystallized from isopropanol, had a melting point of 126–128° C. The yield was 52% of theory.

*Analysis.*—$C_{22}H_{26}N_4O_2 \cdot 2C_4H_4O_4$ mol. wt. 610.6: Calculated (percent): C, 59.01; H, 5.61; N, 9.18. Found (percent): C, 58.80; H, 5.85; N, 8.86.

EXAMPLE 34

5,10-dihydro-5-[(2'-methyl-piperidino)-acetyl]-11H-dibenzo[b,e][1,4]diazepin-11-one A mixture of 4.2 gm. of 5-chloroacetyl-5,10-dihydro-11H-dibenzo[b,e][1,4]diazepin-11-one, 10 cc. of 2-methylpiperidine and 200 cc. of absolute benzene was refluxed for 18 hours. Thereafter, the reaction solution was evaporated in vacuo, the residue was dissolved in methylene chloride, and the solution was washed with water and evaporated. The residue was recrystallized from ethanol/ether, yielding 45% of theory of the compound, M.P. 188–189° C., of the formula

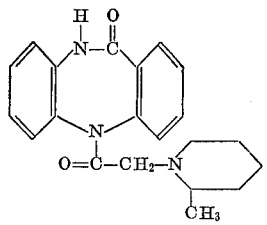

*Analysis.*—C₂₁H₂₃N₃O₂; mol. wt. 349.4: Calculated (percent): C, 72.18; H, 6.63; N, 12.03. Found (percent): C, 72.40; H, 6.44; N, 12.20.

EXAMPLE 35

Using a procedure analogous to that described in Example 34, 35% of theory of 5-[(3'-methyl-piperidino)-acetyl] - 5,10 - dihydro - 11H - dibenzo[b,e][1,4]diazepin-11-one, M.P. 112–114° C. (from aqueous methanol), were obtained from 5-chloroacetyl - 5,10 - dihydro-11H-dibenzo[b,e][1,4]diazepin-11-one and 3 - methyl-piperidine.

*Analysis.*—C₂₁H₂₃N₃O₂; mol. wt. 349.4: Calculated (percent): C, 72.18; H, 6.63; N, 12.03. Found (percent): C, 72.30; H, 6.78; N, 11.92.

The hydrochloride had a melting point of 210–213° C. (decomp.).

EXAMPLE 36

Using a procedure analogous to that described in Example 34, 55% of theory of 5-[(4'-methyl-piperidino)-acetyl] - 5,10 - dihydro - 11H - dibenzo[b,e][1,4]diazepin-11-one, M.P. 202–203° C. (from absolute ethanol), were obtained from 5-chloroacetyl - 5,10 - dihydro-11H-dibenzo[b,e][1,4]diazepin - 11 - one and 4-methyl-piperidine.

*Analysis.*—C₂₁H₂₃N₃O₂; mol wt. 349.4: Calculated (percent): C, 72.18; H, 6.63; N, 12.03. Found (percent): C, 71.90; H, 6.79; N, 11.82.

EXAMPLE 37

Using a procedure analogous to that described in Example 34, 32% of theory of 5-[(2'-ethyl-piperidino)-acetyl-5,10-dihydro-11H - dibenzo[b,e][1,4]diazepin-11-one, M.P. 168–170° C. (from ethylacetate/ether), were obtained from 5-chloroacetyl-5,10-dihydro-11H-dibenzo[b,e][1,4]diazepin-11-one and 2-ethyl-piperidine.

*Analysis.*—C₂₂H₂₅N₃O₂; mol wt. 363.5: Calculated (percent): C, 72.70; H, 6.93; N, 11.56. Found (percent): C, 72.60; H, 7.02; N, 11.25.

EXAMPLE 38

Using a procerure analogous to that described in Example 34, 5-[(2'-ethyl-piperidino)-acetyl]-10-methyl-5,10-dihydro-11H-dibenzo[b,e][1,4]diazepin-11-one was obtained from 5-chloroacetyl-5,10-dihydro-10methyl-11H-dibenzo[b,e][1,4]diazepin-11-one and 2-ethyl-piperidine.

The raw base was filtered in a mixture of ethylacetate and chloroform (1:1) through a silica gel column, the filtrate was evaporated in vacuo, the residue was dissolved in ethanol, the solution was acidified with etheral hydrochloric acid, and the precipitate formed thereby was collected and recrystallized from isopropanol/ether, yielding 65% of theory of the hydrochloride, M.P. 174° C. (decomp.).

*Analysis.*—C₂₃H₂₈ClN₃O₂; mol wt. 413.95: Calculated (percent): C, 66.74; H, 6.8; N, 10.15; Cl, 8.56. Found (percent): C, 66.45; H, 6.70; N, 10.15; Cl, 8.24.

EXAMPLE 39

Using a procedure analogous to that described in Example 34, 45% of theory of 5-[4'-methoxy-piperidino-acetyl]-5,10-dihydro - 11H - dibenzo[b,e][1,4]diagepin-11-one, M.P. 166–167° C. after recrystallization from ethylacetate and subsequently from acetone/ether, of the formula

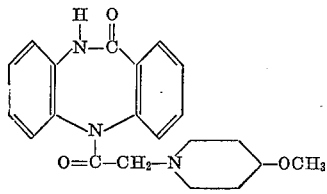

where obtained from 5-chloroacetyl-5,10-dihydro-11H-dibenzo[b,e][1,4]diagepin-11-one and 4-methoxy-piperidine.

*Analysis.*—C₂₁H₂₃N₃O₃; mol wt. 365.4: Calculated (percent): C, 69.02; H, 6.34; H, 11.50. Found (percent): C, 69.20; H, 6.31; N, 11.72.

EXAMPLE 40

2-chloro-5,10-dihydro-5-[(2'-methyl-piperidino)-acetyl-11H-dibenzo[b,e][1,4]diazepin-11-one A mixture of 6.4 gm. of 2-chloro-5-chloroacetyl-5, 10-dihydro - 11H - dibenzo[b,e][1,4]diazepin-11-one, 9.9 gm. of 2-methyl-piperidine and 100 cc. of dioxane was refluxed for four hours. Thereafter, the reaction solution was evaporated in vacuo, the residue was admixed with water, the aqueous mixture was made alkaline with ammonia, and the alkaline solution was extracted with chloroform. The chloroform extract solution was washed with water, dried over sodium sulfate and evaporated. The residue was recrystallized from isopropanol, yielding 65% of theory of the compound, M.P. 189–191° C., of the formula

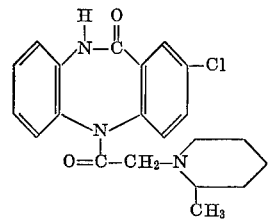

*Analysis.*—C₂₁H₂₂ClN₃O₂; mol. wt. 383.9: Calculated (percent): C, 65.70; H, 5.78; N, 10.95; Cl, 9.23. Found (percent): C, 65.60; H, 5.68; N, 11.07; Cl, 9.32.

EXAMPLE 41

Using a procedure analogous to that described in Example 40, 56% of theory of 2-chloro-5-[(2'-ethyl-piperidino)-acetyl]-5,10 - dihydro - 11H-dibenzo[b,e][1, 4]diazepin-11-one, M.P. 181–184° C. (from toluene), were obtained from 2-chloro-5-chloroacetyl-5,10-dihydro-11H-dibenzo[b,e][1,4]diazepin-11-one and 2-ethyl-piperidine is isopropanol.

*Analysis.*—C₂₂H₂₄ClN₃O₂– mol. wt. 397.9: Calculated (percent): C, 66.41; H, 6.08; N, 10.56; Cl, 8.91. Found (percent): C, 66.20; H, 5.99; N, 10.45; Cl, 8.62.

EXAMPLE 42

Using a procedure analogous to that described in Example 40, 80% of theory of 2-chloro-5-[(2'-methyl-piperidino)-acetyl-10-methyl-5,10 - dihydro-11H-dibenzo[b,e][1,4]diazepin-11-one, M.P. 112–114° C. (from benzene), were obtained from 2-chloro-5-chloroacetyl-5,10-dihydro-10-methyl - 11H - dibenzo[b,e][1,4]diazepin-11-one and 2-methyl-piperidine in isopropanol.

*Analysis.*—C₂H₂₆ClN₃O₂; mol wt. 411.9: Calculated (percent): C, 67.07; H, 6.36; N, 10.20; Cl, 8.60. Found (percent): C, 67.30; H, 6.55; N, 10.07; Cl, 8.70.

EXAMPLE 43

Using a procedure analogous to that described in Example 34, 5-[(2'-ethyl-piperidino)-acetyl]-10-ethyl-5, 10-dihydro-11H - dibenzo[b,e][1,4]diazepin-11-one was obtained from 5-chloroacetyl-5,10-dihydro-10-ethyl-11H- dibenzo[b,e][1,4]diazepin-11-one and 2-ethyl-piperidine by refluxing for seven hours in dioxane.

The residue of the evaporated methylene chloride solution was dissolved in cyclohexane, the solution was admixed with ethereal hydrochloric acid, and the precipitate formed thereby was recrystallized from isopropanol/ether, yielding 55% of theory of the hydrochloride, M.P. 178–181° C. (decomp.).

Analysis.—$C_{24}H_{30}ClN_3I_2$; mol wt. 427.97: Calculated (percent): N, 9.82; Cl, 8.47. Found (percent): N, 9.51; Cl, 8.45.

EXAMPLE 44

Using a procedure analogous to that described in Example 43, 5-[(4'-n-propyl-piperidino)-acetyl]-5,10-dihydro-11H-dibenzo[b,e][1,4]diazepin-11-one was obtained from 5-chloroacetyl-5,10-dihydro-11H-dibenzo[b,e][1,4]diazepin-11-one and 4-n-propyl-piperidine in dioxane.

The raw base was dissolved in ether, the solution was acidified with ethereal hydrochloric acid, and the precipitate formed thereby was collected and recrystallized from isopropanol/ether, yielding 40% of theory of the hydrochloride, M.P. 210–215° C. (decomp.).

Analysis.—$C_{23}H_{28}ClN_3O_2$; mol. wt. 413.9: Calculated (percent): N, 10.15; Cl, 8.56. Found (percent): N, 10.00; Cl, 8.88.

EXAMPLE 45

Using a procedure analogous to that described in Example 43, 5-[(2'-methyl-piperidino)-acetyl]-10-ethyl-5,10-dihydro - 11H - dibenzo[b,e][1,4]diazepin-11-one was obtained from 5-chloroacetyl-5,10-dihydro-10-ethyl-11H-dibenzo[b,e][1,4]diazepin-11-one and 2-methyl-piperidine in dioxane.

The residue of the evaporated methylene chloride solution of the raw base was dissolved in isopropanol, the solution was admixed with a saturated solution of fumaric acid in isopropanol, and the crystalline precipitate formed thereby was recrystallized from acetone/ether, yielding 50% of theory of the fumarate, M.P. 135° C. (decomp.).

The pure base, M.P. 106–108° C., was obtained by dissolving the fumarate in water, making the solution alkaline with sodium hydroxide, extracting the alkaline solution with methylene chloride, and evaporating the extract solution.

Analysis.—$C_{23}H_{27}N_3O_2$; mol. wt. 377.5: Calculated (percent): C, 73.18; H, 7.21; N, 11.13. Found (percent): C, 73.40; H, 7.24; N, 11.35.

EXAMPLE 46

Using a procedure analogous to that described in Example 40, 65% of theory of 5-[(2'-methyl-piperidino)-acetyl]-8-chloro - 5,10 - dihydro - 11H - dibenzo[b,e][1,4]diazepin-11-one, M.P. 164–166° C. [from cyclohexane/isopropanol (1:1)], were obtained from 5-chloroacetyl-5,10-dihydro-8-chloro - 11H - dibenzo[b,e][1,4]diazepin-11-one (M.P. 243–245° C.) and 2-methyl-piperidine in isopropanol.

Analysis.—$C_{21}H_{22}ClN_3O_2$; mol. wt. 383.9: Calculated (percent): C, 65.70; H, 5.78; N, 10.95; Cl, 9.23. Found (percent): C, 65.40; H, 5.75; N, 10.96; Cl, 9.10.

EXAMPLE 47

Using a procedure analogous to that described in Example 34, 5 - [(2',6' - dimethyl-piperidino)-acetyl]-5,10-dihydro-11H-dibenzo[b,e][1,4]diazepin-11-one, of the formula

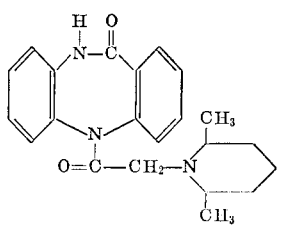

was obtained from 5-chloroacetyl-5,10-dihydro-11H-dibenzo[b,e][1,4]diazepin-11-one and 2,6-dimethyl-piperidine by refluxing in dioxane for 3.5 hours.

The methylene chloride extract solution was washed with water and extracted with aqueous dilute hydrochloric acid. The acid extract solution was evaporated in vacuo, and the residue was recrystallized from isopropanol/ether, yielding 35% of theory of the hydrochloride, M.P. 221–223° C.

Analysis.—$C_{22}H_{26}ClN_3O_2$; mol. wt. 399.9: Calculated (percent): C, 66.08; H, 6.55; N, 10.51; Cl, 8.87. Found (percent): C, 66.20; H, 6.45; N, 10.55; Cl, 8.68.

The compounds according to the present invention, i.e. those embraced by Formula I above and their non-toxic, pharmacologically acceptable acid addition salts, have useful pharmacodynamic properties. More particularly, the compounds of this invention exhibit stomach ulcer inhibiting and stomach juice secretion inhibiting activities in warm-blooded animals, such as rats.

Compounds of the Formula I wherein the 5-position is substituted by a dimethylamino-acetyl or diethylamino-acetyl group have been described in the literature. Also described in the literature are compounds of the Formula I wherein the 5-position is occupied by a dialkylamino-propionyl substituent. However, the prior art is silent about pharmacological activities of these compounds [A. M. Monro et al., J. Med. Chem. 6, 255 (1963)]. Moreover, we have ascertained that compounds of the Formula I wherein the 5-position is occupied by a basic-substituted propionyl radical do not exhibit effective ulcer- and secretion-inhibiting activties. For example, the compounds 5,10-dihydro-5-[(4'-methyl-1'-piperazinyl)acetyl]-11H-dibenzo[b,e][1,4]diazepin-11-one dihydrochloride, 2-chloro-5,10-dihydro-5-[(4'-methyl-1'-piperazinyl)acetyl]-11H-dibenzo[b,e][1,4]diazepin-11-one dihydrochloride, 8-chloro-5,10-dihydro-5-[(4'-methyl-1'-piperazinyl)acetyl]-11H-dibenzo[b,e][1,4]diazepin-11-one, 5,10-dihydro-5-[(2'-methyl-piperidino)-acetyl]-11H-dibenzo[b,e][1,4]diazepin-11-one, 5,10-dihydro-5-[(3'-methyl-piperidino)-acetyl]-11H-dibenzo[b,e][1,4]diazepin-11-one, 5,10-dihydro-5-[(4'-methyl-piperidino)-acetyl]-11H-dibenzo[b,e][1,4]diazepin-11-one, 5,10-dihydro-5-[(2'-ethyl-piperidino)-acetyl]-11H-dibenzo[b,e][1,4]diazepin-11-one, 5,10-dihydro-5-[(4'-methoxy-piperidino)-acetyl]-11H-dibenzo[b,e][1,4]diazepin-11-one, 5,10-dihydro-10-methyl-5-[(2'-ethyl-piperidino)-acetyl]-11H-dibenzo[b,e][1,4]diazepin-11-one and 2-chloro-5,10-dihydro-5-[(2'-methyl-piperidino)-acetyl]-11H-dibenzo[b,e][1,4]diazepin-11-one, when used in doses of 50 to 100 mg./kg., produce an inhibition of ulcer formation of 50% up to almost 100% in rats, observed 22 hours after peroral administration. Atropine produces an approximately equal ulcer-inhibiting effect; the compounds according to the invention, however, are far superior to atropine, because they exhibit a certain symptomatic and organic specificity. Thus, the remaining anticholinergic properties and some of the undesirable side-effects (peristalsis-inhibiting effect on the intestines, accommodation disorder of the eyes, inhibition of saliva secretion) clearly recede. The spasmolytic action reaches, for instance, only 1/10 to 1/50 of the action of atropine sulfate against spasms induced by acetylcholine in the intestines of guinea-pigs.

The compounds mentioned above reduce the quantity of excreted gastric fluid at a dosage rate of 20 mg./kg. rat i.d. or i.p. by 30 to 90%, and they decrease the quantity of free hydrochloric acid released into the stomach and of the total hydrochloric acid in a significant manner.

Toxicity tests, carried out in white mice, resulted in peroral LD$_{50}$-values about equal to or greater than 1500 mg./kg. 5,10 - dihydro - 5 - [(4' - methyl-1'-piperazinyl)- acetyl] - 11H - dibenzo[b,e][1,4]diazepin - 11-one dihydrochloride, for example, shows an $LD_{50}$-value of 1562 mg./kg.

The inhibiting effect on the formation of stress-ulcers was tested by the method of G. Rossi, S. Bonfils et al, C. R. Soc. Biol. 150, 2124 (1956), in male FW 49-rats with a body weight of 140 to 150 gm. The rats, which had been fasted for 24 hours, were immobilized under ether-anesthesia by means of plaster bandages. The active ingredients were administered perorally five minutes before the anesthesia. Per compound 10 animals were used. The control animals received 1 ml. of a 0.9% physiological sodium chloride solution in the same manner. After 22 hours the rats were killed by ether-inhalation, the stomach was removed it was opened by cutting along the great curvature and stretched open on a cork plate. The evaluation was carried out according to the method described in Med. Exp. 4, 284–292 (1961).

The inhibiting effect on the formation of stress-ulcers was also examined by the method of Takagi, Jap. J. Pharmac. 18, 9–18 (1968). Recently fed rats of both sexes having an average body weight of 240 to 260 gm. were individually placed into small wire cages. In these cages they were immersed into a water bath, which was maintained at a constant temperature of 23° C., in such a way that only their heads and breast-bones remained above the surafce of the water. The compounds were administered perorally about 5 to 10 minutes before. Per compound 5 animals were used. The control animals received in the same way 1 ml. of a 0.9% physiological sodium chloride solution. After 16 hours the rats were killed by a lethal dose of ethylchloride and subsequently their stomachs were removed. The stomach was opened by cutting along the great curvature and stretched open on a cork plate. The evaluation was again carried out according to the method described in Med. Exp. 4, 284—292 (1961). The effect on the gastric fluid secretion was determnied by the method of Shay et al., Gastroenterology 5, 43–61 (1945). The pylorus of fasted male rats of the FW-49-strain, weighing 140 to 150 gm., was tied off under Evipan-anesthesia (100 mg/kg. i.p.). The compounds were administered intraduodenally immediately after the pylorus ligature or intraperitoneally about 30 minutes or one hour after pylorus ligature in a dose of 20 mg./kg. Per compound 10 animals were used. The control animals received 0.25 ml. of a 0.9% physiological sodium chloride solution i.d. After five hours the rats were killed under ethylchloride anesthesia, the stomach was taken out, opened along the great curvature and the gastric fluid was collected. The free and the total hydrochloric acid content of the gastric fluid was determined by titration with N/50 sodium hydroxide solution.

The spasmolytic action was determined in vitro on the colon of the guinea-pig by the test procedure according to R. Magnus, Pflügers Archiv 102, 123 (1904). The spasms were induced with acetylcholine; the comparison compound was atropine sulfate. The spasmotic was added one minute before the addition of the spasmolytic, the time of action of the spasmolytic amounted to one minute.

The toxicity was determined after peroral administration of the compounds to fasted white mice of 18 to 20 gm. body weight, and the $LD_{50}$ was calculated according to Litchfield and Wilcoxon. The animals were observed for 14 days. For each dose a group of 5 to 10 mice was used.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.083 to 0.5 mgm./kg. body weight, preferably 0.166 to 0.34 mgm./kg. body weight. The daily dose rate is from 0.33 to 1.67 mgm./kg., preferably 0.5 to 1.0 mgm./kg.

The following examples illustrate a few dosage unit compositions comprising a compound of the instant invention as an active ingredient and represent the best mode contemplated of putting the invention to practical use. The parts are parts by weight unless otherwise specified.

EXAMPLE 48

Tablets

The tablet composition was compounded from the following ingredients:

| | Parts |
|---|---|
| 5,10 - dihydro - 5-[(N'-methyl-piperazino)-acetyl] 11H - dibenzo[b,e][1,4]diazepin - 11 - one hydrochloride | 10.0 |
| Lactose | 148.0 |
| Potato starch | 60.0 |
| Magnesium stearate | 2.0 |
| Total | 220.0 |

Compounding procedure

An aqueous 10% slurry was prepared with a portion of the potato starch by heating. The dibenzodiazepinone compound, the lactose and the remainder of the potato starch were intimately admixed with each other, and the mixture was granulated by moistening it with the slurry and forcing it through a 1.5 mm.-mesh screen. The granulate was dried at 45° C., again passed through the screen and admixed with the magnesium stearate, and the mixture was compressed into 220 mgm. tablets. Each tablet contained 10.0 mgm. of the dibenzodiazepinone compound and, when administered perorally to a warm-blooded animal of about 60 kg. body weight in need of such treatment, produced very good stomach ulcer inhibiting and stomach juice secretion inhibiting effects.

EXAMPLE 49

Coated tablets

The tablets prepared pursuant to Example 48 were coated in conventional manner with a thin shell consisting essentially of talcum and sugar, and the coated tablets were polished with beeswax. The coated tablets produced the same therapeutic effect as the uncoated tablets of the preceding example.

EXAMPLE 50

Hypodermic solution

The solution was compounded from the following ingredients:

| | Parts |
|---|---|
| 5,10 - dihydro - 5 - [(N' - methyl - piperazino) - acetyl] - 11H - dibenzo[b,e][1,4]diazepin - 11 - one dihydrochloride | 2.0 |
| Sodium chloride | 8.0 |
| Distilled water, q.s. ad 1000.0 by vol. | |

Compounding procedure

The dibenzodiazepinone compound and the sodium chloride were dissolved in a sufficient amount of distilled water, the solution was diluted to the indicated volume with additional distilled water and then filtered until free from suspended particles, and the filtrate was filled into 1 cc. ampules which were then sealed and sterilized for 20 minutes at 120° C. Each ampule contained 2 mgm. of the dibenzodiazepinone compound, and when the contents thereof were administered intraduodenally or intraperitoneally to a warm-blooded animal of about 60 kg. body weight in need of such treatment, very good stomach ulcer inhibiting and stomach juice secretion inhibiting effects were obtained.

EXAMPLE 51

Suppositories

The suppository composition was compounded from the following ingredients:

| | Parts |
|---|---|
| 5,10 - dihydro - 5 - [(N' - methyl - piperazino)-acetyl] - 11H - dibenzo[b,e][1,4]diazepin - 11-one dihydrochloride | 15.0 |
| Cocoa butter | 1685.0 |
| Total | 1700.0 |

Compounding procedure

The finely pulverized dibenzodiazepinone compound was suspended with the aid of an immersion homogenizer in the cocoa butter which had been melted and cooled to 40° C. 1700 mgm.-portions of the homogeneous mixture were then poured into cooled suppository molds. Each suppository contained 15 mgm. of the dibenzodiazepinone compound and, when administered by the rectal route to a warm-blooded animal of about 60 kg. body weight in need of such treatment, produced very good stomach ulcer inhibiting and stomach juice secretion inhibiting effects.

EXAMPLE 52

Drop solution

The solution was compounded from the following ingredients:

| | Parts |
|---|---|
| 5,10 - dihydro - 5 - [(N' - methyl - piperazino)-acetyl] - 11H - dibenzo[b,e][1,4]diazepin-11-one dihydrochloride | 1.0 |
| Methyl p-hydroxy-benzoate | 0.035 |
| Propyl p-hydroxy-benzoate | 0.015 |
| Anise oil | 0.05 |
| Menthol | 0.06 |
| Ethanol, pure | 10.00 |
| Sodium cyclamate | 1.00 |
| Glycerin | 15.00 |
| Distilled water, q.s. ad 100.00 by vol. | |

Compounding procedure

The dibenzodiazepinone compound and the sodium cyclamate were dissolved in about 70 parts by volume of distilled water, and the glycerin was added to the solution. The p-hydroxy-benzoates, the oil of anise and the menthol were dissolved in the ethanol, and the resulting solution was stirred into the aqueous solution. Finally, the mixed solution was diluted to the indicated volume with distilled water and hten filtered until free from suspended matter. 1 cc. (20 drops) of the filtrate contained 10 mgm. of the dibenzodiazepinone compound and, when administered perorally to a warm-blooded animal of about 60 kg. body weight in need of such treatment, produced very good stomach ulcer inhibiting and stomach juice secretion inhibiting effects.

A pharmaceutical dosage unit composition comprising a compound of the present invention as an active ingredient may, in addition, also contain one effective dosage unit of one or more other active ingredients having different pharmacodynamic properties, such as sedatives, tranquilizers, local anesthetics, astringents, antacids or the like, as illustrated by the following examples:

EXAMPLE 53

Coated pills

The pill core composition was compounded from the following ingredients:

| | Parts |
|---|---|
| 5,10 - dihydro - 5 - [(N' - methyl - piperazino)-acetyl] - 11H - dibenzo[b,e][1,4]diazepin - 11-one dihydrochloride | 10.0 |
| Phenyl-ethyl-barbituric acid | 25.0 |
| Lactose | 50.0 |
| Corn starch | 30.0 |
| Polyvinylpyrrolidone | 4.0 |
| Magnesium stearate | 1.0 |
| Total | 120.0 |

Compounding procedure

The dibenzodiazepinone compound, the barbituric acid compound, the lactose and the corn starch were intimately admixed with each other, the mixture was granulated by moistening it with an ethanolic 10% solution of the polyvinylpyrrolidone and forcing the moist mass through a 1.5 mm.-mesh screen, the granulate was dried at 45° C. and again passed through a 1 mm.-mesh screen, the dry granulate was admixed with the magnesium stearate, and the mixture was compressed into 120 mgm.-pill cores which were then coated with a thin shell consisting essentially of talcum and sugar. The coated pills were finally polished with beeswax. Each coated pill contained 10.0 mgm. of the dibenzodiazepinone compound and 25.0 mgm. of the barbituric acid compound and, when administered perorally to a worm-blooded animal of about 60 kg. body weight in need of such treatment, produced very good stomach ulcer inhibiting, stomach juice secretion inhibiting and sedative effects.

EXAMPLE 54

Coated pills

The pill core composition was compounded from the following ingredients:

| | Parts |
|---|---|
| 5,10-dihydro - 5 - [(N'-methyl-piperazino)-acetyl]-11H - dibenzo[b,e][1,4]diazepin - 11 - one dihydrochloride | 10.0 |
| 2-diethylamino-2,6'-acetoxylidide | 50.0 |
| Lactose | 98.0 |
| Corn starch | 50.0 |
| Polyvinylpyrrolidone | 10.0 |
| Magnesium stearate | 2.0 |
| Total | 220.0 |

Compounding procedure

The dibenzodiazepinone compound, the acetoxylidide compound, the lactose and the corn starch were intimately admixed with each other, the mixture was granulated by moistening it with an ethanolic 20% solution of the polyvinylpyrrolidone and forcing the moist mass through a 1.5 mm.-mesh screen, the granulate was dried at 45° C. and again passed through the screen, the dry granulate was admixed with the magnesium stearate, and the mixture was compressed into 220 mgm.-pill cores which were then coated with a thin shell consisting of talcum and sugar. The coated pills were finally polished with beeswax. Each coated pill contained 10.0 mgm. of the dibenzodiazepinone compound and 50.0 mgm. of the acetoxylidide compound and, when administered perorally to a warm-blooded animal of about 60 kg. body weight in need of such treatment, produced very good stomach ulcer inhibiting, stomach juice secretion inhibiting and local anesthetic effects.

EXAMPLE 55

Soluble powder

The powder was compounded from the following ingredients:

| | Parts |
|---|---|
| 5,10-dihydro - 5 - [(N'-methyl-piperazino)-acetyl]-11H - dibenzo[b,e][1,4]diazepin - 11 - one dihydrochloride | 10.0 |
| Diacetyltannin albumin with 6% silver | 300.0 |
| Total | 310.0 |

Compounding procedure

The two ingredients were intimately admixed with each other, and 310 mgm.-portions of the mixture were filled into aluminum foil packages which were then sealed. Each package contained 10 mgm. of the dibenzodiazepinone compound and 300 mgm. of the diacetyltannin compound, and when the contents thereof were dissolved in water and the solution was administered perorally to a warm-blooded animal of about 60 kg. body weight in need of such treatment, very good stomach ulcer inhibiting, stomach juice secretion inhibiting and adstringent effects were produced.

EXAMPLE 56

Chewable tablet

The tablet composition was compounded from the following ingredients:

| | Parts |
|---|---|
| 5,10 - dihydro-5-[(N'-methyl-piperazino)-acetyl]-11H - dibenzo[b,e][1,4]diazepin - 11 - one dihydrochloride | 10.0 |
| Dimagnesium aluminum trisilicate | 500.0 |
| Skimmed milk powder | 300.0 |
| Mannitol | 113.0 |
| Vanillin, milled | 1.0 |
| Cocoa butter | 70.0 |
| Sodium cyclamate, milled | 1.0 |
| Magnesium stearate | 5.0 |
| Total | 1000.0 |

Compounding procedure

The dibenzodiazepinone compound, the dimagnesium aluminum trisilicate, the skimmed milk powder and the mannitol were thoroughly admixed with each other, and the mixture was moistened first with an ethanolic 30% solution of the cocoa butter and then with 0.5 part of distilled water. The moist mass was forced through a 2.0-mm.-mesh screen, the resulting moist granulate was dried at 45° C., and the dry granulate was passed through a 1.5-mm.-mesh screen and then intimately admixed with the remaining ingredients. The mixture was compressed into 1000 mgm.-tablets. Each chewable tablet contained 10 mgm. of the dibenzodiazepinone compound and 500 mgm. of the dimagnesium aluminum trisilicate and, when administered perorally to a warm-blooded animal of about 60 kg. body weight in need of such treatment, produced very good stomach ulcer inhibiting, stomach juice secretion inhibiting and antacid effects.

Analogous results were obtained when an equal amount of any one of the other compounds embraced by formula I above or a non-toxic acid addition salt thereof was substituted for the particular dibenzodiazepinone compound in Examples 48 to 56. Likewise, the amount of active ingredient in these examples may be varied to achieve the dosage unit range set forth above, and the amounts and nature of the inert pharmaceutical carrier ingredient may be varied to meet particular requirements.

We claim:
1. A compound of the formula

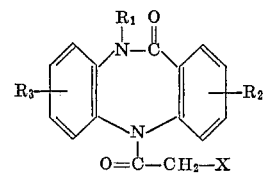

wherein
$R_1$ is hydrogen or alkyl of 1 to 4 carbon atoms,
$R_2$ and $R_3$ are each hydrogen or chlorine, and
X is morpholino, piperidino, pyrrolidino, piperazino, N'-methyl-piperazino, N' - ethyl - piperazino, N'-benzyl-piperazino, N'-hydroxyethyl-piperazino, N'-methyl-benzyl-piperazino, hexamethyleneimino, methyl-piperidino, ethyl-piperidino, methoxypiperidino, propyl-piperidino or dimethyl-piperidino, or a non-toxic, pharmacologically acceptable acid addition salt thereof.

2. A compound according to claim 1, which is 5-[(N'-methyl-piperazino-acetyl] - 5,10 - dihydro-11H-dibenzo[b,e][1,4]diazepin-11-one or a non-toxic, pharmacologically acceptable acid addition salt thereof.

3. A compound according to claim 1, which is 2-chloro-5 - [(N'-methyl-piperazino)-acetyl] - 5,10 - dihydro - 11H - dibenzo[b,e][1,4]diazepin-11-one or a non-toxic, pharmacologically acceptable acid addition salt thereof.

4. A compound according to claim 1, which is 8-chloro - 5 - [(N'-methyl-piperazino)-acetyl] - 5,10 - dihydro-11H-dibenzo[b,e][1,4]diazepin - 11 - one or a non-toxic, pharmacologically acceptable acid addition salt thereof.

5. A compound according to claim 1, which is 5-[(2'-methyl-piperidino)-acetyl] - 5,10 - dihydro - 11H - dibenzo[b,e][1,4]diazepin - 11 - one or a non-toxic, pharmacologically acceptable acid addition salt thereof.

6. A compound according to claim 1, which is 5-[(4'-methyl-piperidino)-acetyl] - 5,10 - dihydro - 11H - dibenzo[b,e][1,4]diazepin - 11 - one or a non-toxic, pharmacologically acceptable acid addition salt thereof.

7. A compound according to claim 1, which is 5-[(2'-ethyl-piperidino)-acetyl] - 5,10 - dihydro - 11H-dibenzo[b,e][1,4]diazepin - 11 - one or a non-toxic, pharmacologically acceptable acid addition salt thereof.

8. A compound according to claim 1, which is 5-[(4'-methoxy-piperidino)acetyl - 5,10 - dihydro - 11H-dibenzo[b,e][1,4]diazepin-11-one or a non-toxic, pharmacologically acceptable acid addition salt thereof.

9. A compound according to claim 1, which is 10-methyl - 5-[(2'-ethyl-piperidino)-acetyl] - 5,10 - dihydro-11H-dibenzo[b,e][1,4]diazepin - 11 - one or a non-toxic, pharmacologically acceptable acid addition salt thereof.

10. A compound according to claim 1, which is 2-chloro-10-methyl - 5 - [(N'-methyl-piperazino)-acetyl]-5,10 - dihydro - 11H-dibenzo[b,e][1,4]diazepin - 11-one or a non-toxic, pharmacologically acceptable acid addition salt thereof.

11. A compound according to claim 1, which is 5-[(N'-o-methylbenzyl-piperazino)-acetyl] - 5,10 - dihydro-11H-dibenzo[b,e][1,4]diazepin - 11 - one or a non-toxic, pharmacologically acceptable acid addition salt thereof.

12. A compound according to claim 1, which is 2-chloro - 5 - [pyrrolidino-acetyl] - 5,10 - dihydro-11H-dibenzo[b,e][1,4]diazepin - 11 - one or a nontoxic, pharmacologically acceptable acid addition salt thereof.

13. A compound according to claim 1, which is 2-chloro - 5 - [piperidino-acetyl] - 5,10 - dihydro - 11H-dibenzo[b,e][1,4]diazepin - 11 - one or a non-toxic, pharmacologically acceptable acid addition salt thereof.

14. A compound according to claim 1, which is 2-chloro - 10 - methyl - 5 - [morpholino-acetyl] - 5,10-dihydro - 11H - dibenzo[b,e][1,4]diazepin 11 - one or a non-toxic, pharmacologically acceptable acid addition salt thereof.

15. A compound according to claim 1, which is 10-methyl - 5 - [(N'-methyl-piperazino)-acetyl] - 5,10-dihydro - 11H - dibenzo[b,e][1,4]diazepin - 11 - one or a non-toxic, pharmacologically acceptable acid addition salt thereof.

16. A compound according to claim 1, which is 10-methyl - 5 - [(N'-β-hydroxyethyl-piperazino)-acetyl]-5,10 - dihydro - 11H-dibenzo[b,e][1,4]diazepin-11-one or a non-toxic, pharmacologically acceptable acid addition salt thereof.

References Cited

UNITED STATES PATENTS 3,347,849  10/1967  Schmutz et al. ____ 260—239.3
3,419,547  12/1968  Schmutz et al. ____ 260—239.3

OTHER REFERENCES

Monro et al., J. Med. Pharm. Chem., vol. 6, pp. 255–261 (1963).

HENRY R. JILES, Primary Examiner
R. T. BOND, Assistant Examiner

U.S. Cl. X.R.

424—244, 250, 267, 248, 274

UNITED STATES PATENT OFFICE
CERTIFICATE OF CORRECTION

Patent No. 3,634,408          Dated January 11, 1972

Inventor(s) GUNTHER SCHMIDT, ROBERT ENGELHORN, MATYAS LEITOLD and HANS MACHLEIDT It is certified that error appears in the above-identified patent and that said Letters Patent are hereby corrected as shown below:

Col. 3, line 27: correct that part of the formula which reads  to read

Col. 7, line 57: correct that part of the formula which reads 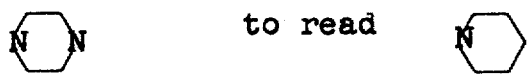 to read Col. 8, line 42: change "N₁₉" to read --H₁₉--;
" 46: change "1,10-dihydro" to read --5,10-dihydro--;
" ": place closing bracket after "acetyl".
Col.12, line 13: place parenthesis before "N'".
Col.13, line 54: correct the spelling of "procedure";
" 68: change "H, 6.8" to read --H, 6.81--;
" 73: place parenthesis before "4'";
" 74: correct the spelling of "diazepin".
Col.14, line 12: " " " " "
" 54: change "is" to --in--
" 62: change "methyl" to --ethyl--;
" 65: " " " "
" 67: change "C₂" to --C₂₆--.
Col.17, line 27: correct the spelling of "surface".
Col.20, line 33: correct the spelling of "warm-blooded";
" 47: change "2,6'" to read --2',6'--.
Col.22, line 51: place closing bracket after "acetyl".

Signed and sealed this 18th day of July 1972.

(SEAL)
Attest:

EDWARD M. FLETCHER, JR.
Attesting Officer

ROBERT GOTTSCHALK
Commissioner of Patents